Figure 1:
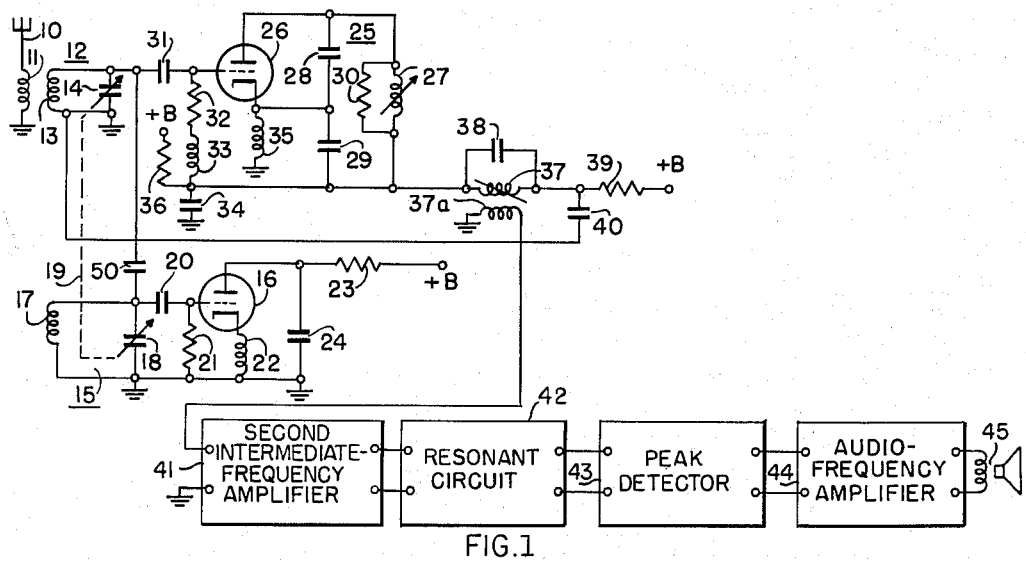

May 29, 1956 D. RICHMAN 2,748,267
SUPERREGENERATIVE SUPERHETERODYNE WAVE-SIGNAL RECEIVER
Filed May 16, 1952 2 Sheets-Sheet 1

*INVENTOR.*
DONALD RICHMAN
BY Laurence B. Dodds
ATTORNEY

United States Patent Office 2,748,267
Patented May 29, 1956

2,748,267

SUPERREGENERATIVE SUPERHETERODYNE WAVE-SIGNAL RECEIVER

Donald Richman, Flushing, N. Y., assignor to Hazeltine Research, Inc., Chicago, Ill., a corporation of Illinois Application May 16, 1952, Serial No. 288,107

13 Claims. (Cl. 250—20)

GENERAL

This invention relates to wave-signal receivers, and particularly, to such receivers of the superregenerative superheterodyne type.

Superregenerative receivers are principally employed for the reception of relatively high-frequency wave signals. This is because the frequency of the received signal must be widely separated in the frequency spectrum from the quench frequency of the superregenerative circuit to minimize interference with the received signal caused by high-order harmonics of the quench signal. For example, the lowest received signal frequency is usually at least two hundred times the quench frequency.

Inherent limitations of high-frequency selective circuits may render it difficult to obtain sufficient selectivity for the reception of, for example, high-frequency angular-velocity-modulated wave signals. Accordingly, superregenerative superheterodyne circuits have been proposed which convert a received high-frequency wave signal to a suitable intermediate-frequency signal by means of one or more frequency conversions. Such circuits may include a plurality of frequency converters to provide frequency conversions, thereby increasing the complexity and hence the cost of the receiver.

Another disadvantage of a superregenerative superheterodyne circuit of the type heretofore proposed utilizing a regenerative stage followed by a highly selective circuit is that undesirable hang-over oscillations may be caused in the superregenerative circuit due to signal feedback through stray coupling between the superregenerative circuit and the selective circuit. Such hang-over oscillations generally impair the sensitivity of the superregenerative circuit. Also, a disadvantage heretofore characteristic particularly of saturation-level mode superregenerative receivers arose from the fact that a superregenerative circuit inherently operates as an oscillator. Consequently, radiation of oscillations generated by the superregenerative circuit may occur and seriously interfere with the operation of nearby wave-signal receivers.

It is an object of the present invention, therefore, to provide a new and improved superregenerative wave-signal receiver which avoids one or more of the disadvantages and limitations of superregenerative receivers heretofore proposed.

It is another object of the invention to provide a new and improved superregenerative superheterodyne wave-signal receiver having substantially improved selectivity.

It is another object of the invention to provide a new and improved superregenerative superheterodyne wave-signal receiver utilizing a relatively simple circuit arrangement for providing improved selectivity by means of two frequency conversions in the superregenerative stage and a highly selective filter network.

It is another object of the invention to provide a new and improved superregenerative superheterodyne wave-signal receiver having improved selectivity and having freedom from undesirable hang-over oscillations in the superregenerative circuit.

It is another object of the invention to provide a new and improved superregenerative superheterodyne wave-signal receiver having freedom from undesirable hang-over oscillations in the superregenerative circuit and also having freedom from back radiation.

In accordance with a particular form of the invention, a superregenerative superheterodyne wave-signal receiver comprises a circuit for supplying a received wave signal and circuit means for supplying one or more heterodyne wave signals having a frequency differing substantially from that of the received signal. The receiver includes a regenerative oscillatory circuit having a free oscillation frequency substantially equal to the frequency difference between the received signal and one of the heterodyne signals and coupled to the supply circuits for deriving from the received signal and the aforesaid one of the heterodyne signals a first wave signal having substantially the above-mentioned free oscillation frequency. The receiver also includes a quench circuit coupled to the regenerative circuit for effecting alternate oscillation build-up and oscillation decay intervals therein to cause superregenerative amplification of the first signal. The regenerative circuit also is responsive to the amplified first signal and to one of the heterodyne signals for deriving therefrom a second wave signal having a frequency differing substantially from that of any of the abovementioned wave signals. The receiver also includes a frequency-responsive circuit which is coupled to the regenerative circuit and primarily responsive to the second signal for selecting at least one component of the second signal.

For a better understanding of the present invention, together with other and further objects thereof, reference is had to the following description taken in connection with the accompanying drawings, and its scope will be pointed out in the appended claims.

Figure 3:
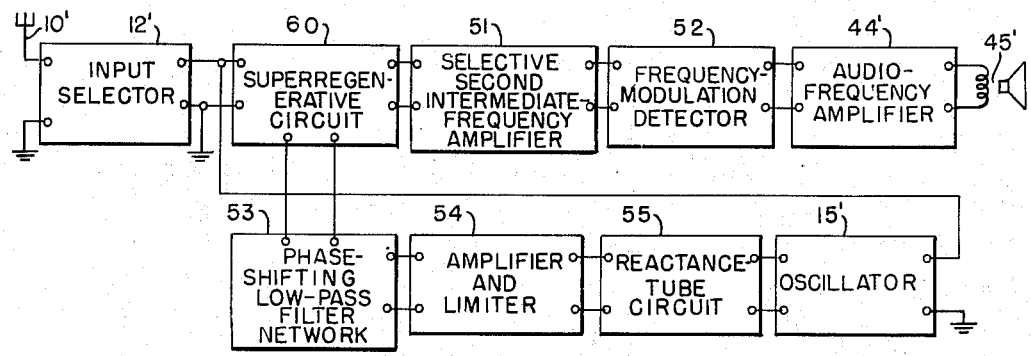
Figure 4:
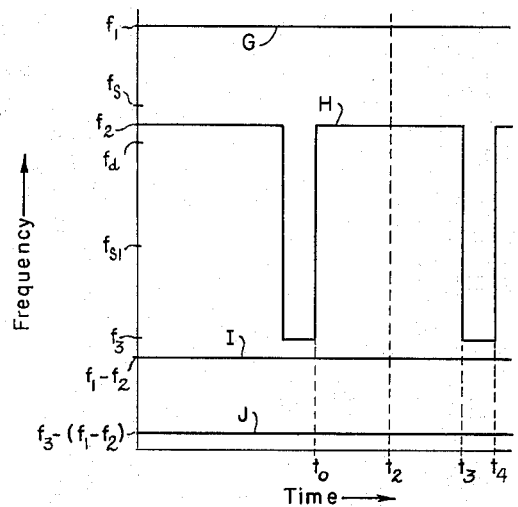
Figure 2:
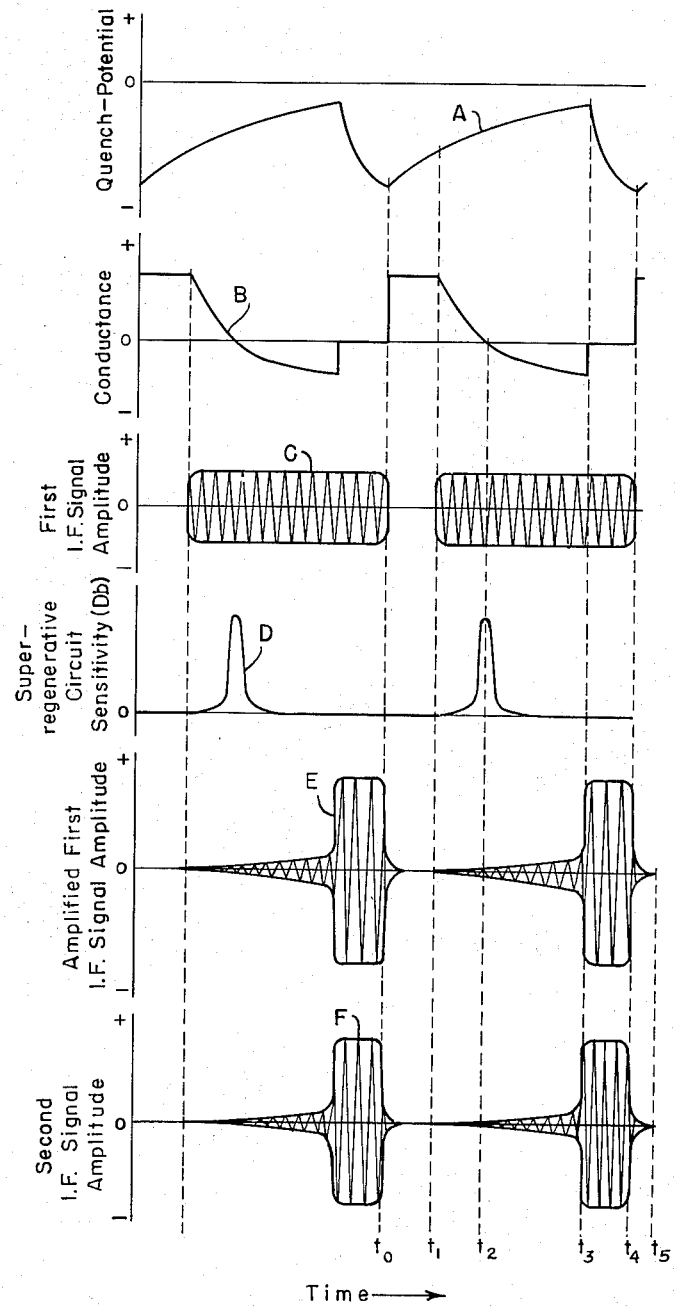

Referring now to the drawings, Fig. 1 is a circuit diagram, partly schematic, representing a complete superregenerative superheterodyne wave-signal receiver embodying the present invention in a particular form; Fig. 2 is a graph representing various operating characteristics of the Fig. 1 receiver and various signals developed by the receiver; Fig. 3 is a circuit diagram, partly schematic, representing a complete superregenerative superheterodyne wave-signal receiver embodying the invention in a modified form; while Fig. 4 is a graph representing various operating characteristics of the Fig. 3 receiver.

*Description of Figure 1 receiver*

Referring now, more particularly, to Fig. 1 of the drawings, there is represented a complete superregenerative superheterodyne wave-signal receiver constructed in accordance with a particular form of the invention and comprising a circuit for supplying a received wave signal in a predetermined frequency range and which may be amplitude-modulated or angular-velocity-modulated. The supply circuit includes an antenna 10 coupled through a transformer winding 11 to a received wave-signal input selector 12 comprising a transformer winding or inductor 13 and a tuning condenser 14.

The receiver also includes a circuit for supplying a heterodyne wave signal having a frequency differing substantially from that of the received wave signal, preferably, by an amount less than the frequency of the received signal. This heterodyne signal-supply circuit comprises an oscillator 15 of conventional circuitry. The oscillator includes a triode tube 16 and a frequency-determining circuit comprising an inductor 17 and a tuning condenser 18. The tuning condenser 18 is mechanically connected, as indicated by the broken line 19, to the condenser 14 of the input selector 12 for unicontrol operation therewith to accomplish tracking, as in conventional heterodyning practice. The frequency-determining circuit 17, 18 is coupled to the control electrode-cathode circuit of the tube 16 through a condenser 20, grid-leak resistor 21 and radio-frequency choke 22. The anode-cathode circuit of the tube 16 is coupled across a source of potential +B through an anode radio-frequency decoupling resistor 23. The anode of the tube 16 is coupled to one terminal of the frequency-determining circuit 17, 18 through a radio-frequency coupling condenser 24.

The superregenerative receiver also includes a regenerative oscillatory circuit having a free oscillation frequency substantially equal to the frequency difference between the received signal and the heterodyne signal developed by the oscillator 15 and which is responsive to both of those signals for deriving therefrom a first wave signal having substantially the free oscillation frequency which, preferably, is substantially different from any frequency in the range of wave signals to be received. It will be understood that in referring to a free oscillation frequency substantially equal to the frequency difference between the received and the heterodyne signals, it is meant that the frequency difference between the received and heterodyne signals lies within a frequency range defined by the free oscillation frequency plus or minus a frequency of the order of the modulation side band of the received signal. The first wave signal will hereinafter be referred to for simplicity as the first intermediate-frequency signal by analogy to conventional superheterodyne practice. The regenerative oscillatory circuit comprises a resonant circuit 25 and a regenerator tube 26 having a nonlinear signal-translating characteristic for deriving from the received signal and the heterodyne signal during the intervals of maximum sensitivity of the regenerative circuit and in accordance with the nonlinear signal-translating characteristic of the tube 26 the first intermediate-frequency signal modulated in accordance with the modulation of the received signal. The resonant circuit 25 comprises an adjustable inductor 27 in parallel with condensers 28 and 29 in series and tuned substantially to aforesaid difference frequency. A damping resistor 30 is included in the resonant circuit to provide adequate damping of the regenerative circuit during each positive conductance period thereof. The anode and cathode of the tube 26 are directly connected across the condenser 28 of the resonant circuit 25. The control electrode-cathode circuit of the tube 26 is coupled to the input selector 12 through a coupling condenser 31, a grid-leak resistor 32, an intermediate-frequency and radio-frequency choke 33, an intermediate-frequency and radio-frequency by-pass condenser 34 and a cathode intermediate-frequency and radio-frequency choke 35. The control electrode of the tube 26 is coupled to the oscillator 15 through the condenser 31 and a coupling condenser 50 and to a source of positive potential +B through a resistor 36 which provides, in conjunction with the condenser 34, grid-circuit stabilization of the superregenerative circuit. Grid circuit stabilization of this type is fully described and claimed in applicant's copending application Serial No. 788,765, filed November 28, 1947, entitled "Self-Quench Superregenerative Receiver." The condenser 34 and resistor 36 preferably have a time constant long with respect to the period of the lowest-frequency modulation components of the received signal for developing a gain-control potential effective to stabilize the operating characteristics of the receiver against operating conditions which tend to modify the average quench frequency of the receiver.

The condenser 31 and the resistor 32 are included in a quench circuit for effecting alternate oscillation build-up and oscillation decay intervals in the regenerative circuit to cause superregenerative amplification of the first intermediate-frequency signal. Although the quench circuit may, for example, be a separate-quench circuit or a self-quench circuit included in the anode or cathode circuits, the quench circuit represented in Fig. 1 is a self-quench circuit included in the control electrode circuit and responsive to the first intermediate-frequency signal for quenching oscillations of the regenerative circuit to provide a saturation-level mode of operation therefor.

The superregenerative receiver further includes a frequency-responsive circuit which is primarily responsive to a second signal derived from the amplified first signal and the heterodyne signal by the regenerative oscillatory circuit and having a frequency differing substantially from that of any of the above-mentioned signals for selecting at least one component of the second signal. The second signal preferably has a frequency equal to the frequency difference between the heterodyne signal and the first intermediate-frequency signal and ordinarily less than the frequency of the first intermediate-frequency signal. The second signal will hereinafter be referred to as the second intermediate-frequency signal by analogy to conventional superheterodyne practice but it will be understood that for some applications the second signal may have a frequency greater than that of any of the received, heterodyne, and first intermediate-frequency signals.

The frequency-responsive circuit preferably comprises a resonant circuit tuned substantially to the frequency of at least one component of the second signal. This resonant circuit includes an adjustable inductor 37 and a parallel-connected condenser 38 which are coupled to the anode-cathode circuit of the tube 26 through a series decoupling resistor 39 connected to the source +B and a shunt by-pass condenser 40 which is directly connected to one terminal of the input selector 12 to maintain that terminal and the corresponding terminal of the resonant circuit 37, 38 at the same intermediate-frequency potential and at the same radio-frequency potential.

The resonant circuit 37, 38 is coupled by way of winding 37a to the input circuit of a second intermediate-frequency amplifier 41 which may serve as a buffer or isolating amplifier. The output circuit of the intermediate-frequency amplifier 41 is connected to a suitable detector system which, for use in connection with the reception of amplitude-modulated wave signals, may comprise a second frequency-responsive circuit responsive to the second signal, for example, a resonant circuit 42 tuned to the frequency of one of the side-band components, including the carrier-frequency component, of the output signal of the second intermediate-frequency amplifier 41 for selecting one of those components. The detector system also includes a peak detector 43 of conventional construction connected in cascade with the resonant circuit 42 for detecting amplitude variations of the output signal of the resonant circuit 42. The resonant circuit 42 preferably has greater selectivity than the resonant circuit 37, 38 to provide an improved overall selectivity characteristic for the receiver. The output circuit of the detector 43 is coupled to a loudspeaker 45 of conventional construction through an audio-frequency amplifier 44 of one or more stages.

*Operation of Fig. 1 receiver*

Considering now the operation of the wave-signal receiver just described with reference to the curves of Fig. 2 of the drawings, the self-quenching action of the regenerative oscillatory circuit will be explained initially. In the absence of a biasing potential, to be considered presently, the energizing potentials applied to the anode-cathode circuit of the regenerator tube 26 permit the generation of oscillations in the regenerative circuit. A portion of these oscillations appears across the cathode inductor 35, causing the cathode of the tube 26 periodically to become negative with respect to the control electrode thereof. The oscillations build up until control-electrode current flow of the tube 26 occurring when the cathode is negative relative to the control electrode causes the accumulation of a charge on the condenser 31. This charge provides an increasing negative bias potential between the control electrode and cathode of the tube 26 until ultimately the tube 26 is biased to anode-current cutoff, thereby initiating a positive conductance interval as indicated at a time $t_0$ on curve B of Fig. 2, which represents the conductance characteristic of the regenerative circuit.

During the time interval $t_0$—$t_1$ when the tube 26 is nonconductive, the charge accumulated by the condenser 31 is dissipated in the grid-leak circuit of the tube 26 in accordance with curve A of Fig. 2, which represents the quench-signal potential developed in the control-electrode circuit of the tube 26. When the charge has fallen to a sufficiently low value and the control-electrode potential has risen sufficiently, as at the time $t_1$, the regenerator tube 26 is rendered conductive. Because of the regenerative connection of the tube 26 to the resonant circuit 25, the tube 26 then imparts a negative conductance component thereto, thus effectively reducing the magnitude of the damping of the regenerative circuit supplied in part by the resistor 30 and reducing the magnitude of the positive conductance as represented by curve B until at the time $t_2$ there is initiated an interval $t_2$—$t_3$ of negative conductance which is commonly termed the oscillation build-up interval. The oscillation build-up interval $t_2$—$t_3$ is terminated at the time $t_3$ by changes in operating conditions, such as the flow of control-electrode current resulting from the decreased bias of the tube 26 as represented by curve A and the large magnitude of oscillations developed in the control electrode-cathode circuit of the tube 26.

During a time interval $t_3$—$t_4$, the regenerative circuit has zero conductance, as represented by curve B, limiting the magnitude of the oscillations developed in the regenerative circuit to a substantially constant value. Also during a major portion of the time interval $t_3$—$t_4$ control-electrode current flows, as explained previously, causing an increase in the negative bias potential developed in the control electrode circuit of the tube 26, as represented by curve A. At the time $t_4$ another positive conductance interval is initiated as explained above. In this fashion the regenerative circuit is self-controlled to provide superregenerative amplification of a signal having substantially the free oscillation frequency thereof.

Considering now the operation of the Fig. 1 receiver with respect to the effective amplification of a received amplitude-modulated wave signal intercepted by the antenna 10, the received wave signal is applied thereby to the input selector 12 which preferably is tuned substantially to the received signal frequency. The heterodyne signal developed by the oscillator 15 is also applied to the input selector 12 through the coupling condenser 50. The input selector 12 has a selectivity characteristic sufficiently broad to cause the selector to provide an adequately high impedance at the frequencies of both the received and the heterodyne signals.

During the conductive intervals of the regenerator tube 26, that tube has a nonlinear input-output signal-translating characteristic which causes it to act as a modulator, developing a first intermediate-frequency wave signal having a frequency equal to the difference between the frequency of the heterodyne signal supplied by oscillator 15 and that of the received signal developed by the input selector 12. The frequency of the oscillator 15 is so selected that the frequency of the first intermediate-frequency signal is substantially equal to the free oscillation frequency of the regenerative circuit 25, 26. The signal derived in this manner by conversion in the regenerative circuit due to the nonlinear signal-translating characteristic of the regenerator tube 26 is represented in an illustrative form by curve C. The signal represented by curve C would be developed in the absence of regeneration.

As explained previously, the quench signal developed by the resistor-condenser network 32, 31, and represented by curve A, causes the regenerative circuit 25, 26 under the control of the tube 26 to have a dynamic conductance which varies between negative and positive values as represented by curve B. Such a regenerative circuit has a sensitivity-time characteristic as represented in decibels in curve D, exhibiting maximum sensitivity at the time when the circuit conductance is approximately zero in the transition from a positive to a negative value.

Due to regeneration, intermediate-frequency oscillations are initiated in the regenerative circuit during each of the sensitive intervals represented by curve D. The intermediate-frequency oscillations occurring during those intervals increase in amplitude until the conductance represented by curve B becomes zero at the time $t_3$ because of control-electrode current flow of the tube 26. These oscillations resulting from the regenerative action are represented by curve E. During the zero conductance or saturation-level intervals, such as $t_3$—$t_4$, the intermediate-frequency oscillations have a substantially constant amplitude characteristic of the saturation-level mode of operation. Thereafter, as during a time interval $t_4$—$t_5$, the oscillations decay in a manner determined by the circuit parameters. The intermediate-frequency oscillations represented by curve E have an amplitude so many times larger than that of the intermediate-frequency signal derived in the regenerative circuit by conversion from the received wave signal and the heterodyne signal that curve C would hardly be perceptible if drawn to the same amplitude scale as curve E. Accordingly, different amplitude scales have been chosen for these curves for the sake of clarity. The regenerative oscillations generated during each quench cycle have an initial amplitude and phase dependent upon the amplitude and phase, respectively, of the intermediate-frequency signal derived by conversion during the periods of maximum sensitivity as represented by curve D. The amplitude first intermediate-frequency signal represented by curve E, therefore, has a modulation envelope and phase which vary in accordance with the modulation of the received signal.

Since a portion of the amplified first intermediate-frequency signal, developed as described, is applied by the resonant circuit 25 to the control electrode-cathode circuit of the tube 26, the regenerative circuit also is responsive to this amplified first intermediate-frequency signal and to the heterodyne signal developed by the oscillator 15, preferably at least during the saturation-level intervals of the regenerative circuit and portions of the oscillation build-up intervals, for deriving from those signals a second signal ordinarily having a large amplitude relative to the received signal and modulated in accordance with the modulation of the received signal. The second signal preferably is a second intermediate-frequency signal derived by a high-level conversion in the tube 26, in accordance with the nonlinear signal-translating characteristic thereof, from the amplified first intermediate-frequency signal and the heterodyne signal which beat together therein. The second intermediate-frequency signal, as developed across the resonant circuit 37, 38 in a manner explained below, is represented by curve F which is drawn to approximately the same amplitude scale as curve E. The amplitude of the second intermediate-frequency signal is large with respect to the amplitude of the received signal but may be of different value from the amplitude of the amplified first intermediate-frequency signal represented by curve E because of the different factors involved in the second conversion, for example, signals of different amplitudes and different operating potentials on the tube 26.

The modulation envelope of the second intermediate-frequency signal represented by curve F is similar to that of the amplified first intermediate-frequency signal represented by curve E and accordingly varies in accordance with the modulation components of the received signal.

The second intermediate-frequency signal, which may be considered as a component of the anode-current flow of the tube 26, is selected from the signals of different frequency in the regenerative circuit by the resonant circuit 37, 38 which is tuned to the second intermediate frequency and develops thereacross the signal of curve F. Accordingly, the resonant circuit 37, 38 applies to the second intermediate-frequency amplifier 41 a signal having modulation components representative of those of the received signal. After suitable amplification, the second intermediate-frequency signal is applied by the amplifier 41 to the resonant circuit 42 which may select one or more of the side-band components of the second intermediate-frequency signal for peak detection by the peak detector 43. The output signal of the peak detector 43 then is applied to audio-frequency amplifier 44 for amplification and to a loudspeaker 45 for reproduction as sound.

In employing the Fig. 1 receiver for the reception of amplitude-modulated wave signals, the resonant circuit 25 is tuned to one or more side-band components of the first intemediate-frequency signal, including the carrier-frequency component thereof. For the reception of angular-velocity-modulated wave signals, such as frequency-modulated wave signals, the resonant circuit 25 may also be tuned to one or more side-band components of the first intermediate-frequency signal. In this event, however, a suitable angular-velocity-modulation detector, for example, a frequency-modulation detector, may be utilized in place of the peak detector 43 for deriving the modulation components of the received signal from the frequency or phase variations of the second intermediate-frequency signal. It will also be understood that while the Fig. 1 receiver is a self-quench super-regenerative receiver, a separately quenched receiver may also be constructed in accordance with the invention. Additionally, it will be seen that because the first intermediate-frequency signal derived by low-level conversion from the received signal during the intervals of maximum sensitivity, such as at the time $t_2$, as represented by curve D of Fig. 2, controls the initiation of the oscillations generated at the first intermediate frequency in the regenerative oscillatory circuit and because the high-level conversion of the first intermediate-frequency signal to the second intermediate-frequency signal provides a signal of large amplitude during the saturation-level intervals, such as the time interval $t_3$—$t_4$, as represented by curve F, the oscillator 15 may be keyed on during intervals corresponding to the maximum sensitivity intervals and the saturation-level intervals $t_3$—$t_4$ to cause the desired frequency conversions at those times. Further, for some applications it may be desirable to utilize a pair of heterodyne signal oscillators to provide the heterodyne signals for the two frequency conversions.

The superregenerative gain of the receiver of the present invention is obtained at a fixed intermediate frequency with the consequent advantage that the receiver may be tuned over a relatively wide range of received wave-signal frequencies without an appreciable variation of the super-regenerative gain over this wide tuning range.

The frequency conversions occurring in the regenerative circuit because of the nonlinear signal-translating characteristic of the regenerator tube 26 explained above produce signals having frequencies equal to the sum and difference frequencies of the received signal and the heterodyne signal supplied by the oscillator 15 and equal to the sum and difference frequencies of the first intermediate-frequency signal and the heterodyne signal. Either of the first-mentioned sum and difference frequency signals may be selected as the first intermediate-frequency signal by appropriate choice of the free oscillation frequency of the regenerative oscillatory circuit. Similarly, either of the second-mentioned sum and difference frequency signals may be selected as the second intermediate-frequency signal by appropriate choice of the resonant frequency of the resonant circuit 37, 38. However, the described use of a first intermediate-frequency low with relation to the received wave-signal frequencies and a second intermediate-frequency low with relation to the first intermediate frequency is desirable from several standpoints. For example, the lowered first intermediate frequency enables the use of a more selective filter network for selecting a particular side-band component thereof for conversion and detection. This selectivity is additionally improved by the use of an even lower second intermediate frequency because, as a practical matter, the effective maximum obtainable Q of band-pass filter networks remains approximately constant over a wide range of frequencies including portions of the intermediate frequency and received signal frequency ranges and, hence, the minimum obtainable pass bands of filter networks of a given type generally increase as the center frequency passed by the network increases. For example, the minimum obtainable pass band of a filter network comprising a single tuned circuit operating at a frequency of 100 megacycles may be approximately 1 megacycle. The minimum obtainable pass band of a similar tuned circuit operating at a first intermediate frequency, of for example, 40 megacycles, may be .4 megacycle. The minimum obtainable pass band of the superregenerative receiver of Fig. 1 imparted thereto by the use of the resonant circuit 42 operating at a second intermediate frequency of, for example, 20 megacycles, may be .2 megacycle. Such improved selectivity is highly desirable in applications where the use of a single intermediate frequency does not provide sufficient image-signal or adjacent-channel rejection.

Description of Fig. 3 receiver

Referring now more particularly to Fig. 3 of the drawings, there is represented a complete superregenerative superheterodyne wave-signal receiver constructed in accordance with a modified form of the invention and which is generally similar to the Fig. 1 receiver. Units of the Fig. 3 receiver corresponding to similar units of the Fig. 1 receiver are designated by similar reference numerals primed.

The Fig. 3 receiver includes an antenna 10' connected to an input selector 12' which is coupled, in cascade and in the order named, to a superregenerative circuit 60, a selective second intermediate-frequency amplifier 51, a frequency-modulation detector 52, an audio-frequency amplifier 44', and a loudspeaker 45'. An oscillator 15' is coupled to the superregenerative circuit 60 in a conventional manner. The superregenerative circuit 60 preferably comprises a regenerative oscillatory circuit and a quench circuit similar to the corresponding circuits included in the Fig. 1 receiver. The selective second intermediate-frequency amplifier 51 may comprise, for example, a second intermediate-frequency amplifier and resonant circuit such as units 41 and 42, respectively, of the Fig. 1 receiver. The frequency-modulation detector 52 may be of conventional construction for deriving the modulation components of the received signal from the frequency variations of the second intermediate-frequency signal.

The Fig. 3 receiver also includes a circuit coupled between the quench circuit of the superregenerative circuit 60 and the oscillator 15' for shifting the frequency of the heterodyne signal supplied by the oscillator to a second frequency differing from the free oscillation frequency of the superregenerative circuit by an amount substantially less than the free oscillation frequency. The second frequency may, for example, be substantially lower than the first frequency of the heterodyne signal and higher than the free oscillation frequency of the superregenerative circuit 60. This circuit comprises a phase-shifting low-pass filter network 53 responsive to the quench signal of the superregenerative circuit 60 for preferably selecting primarily the fundamental-frequency component thereof. The network 53 is coupled to an amplifier and limiter 54 of conventional construction for converting the selected quench-signal component to, for example, a suitable rectangular wave.

The amplifier and limiter 54 is connected to a reactance-tube circuit 55 of conventional construction which is connected to the oscillator 15' for shifting the frequency thereof in response to the above-mentioned rectangular wave.

*Operation of Fig. 3 receiver*

Considering now the operation of the Fig. 3 receiver, a received frequency-modulated wave signal intercepted by the antenna 10' is applied thereby to the input selector 12' and then to the superregenerative circuit 60. The superregenerative circuit 60 converts the received signal to a first intermediate-frequency signal at the free oscillation frequency of the superregenerative circuit, amplifies the first intermediate-frequency signal, and converts the amplified signal to a second intermediate-frequency signal in a manner generally similar to the operation of the Fig. 1 receiver. The selective second intermediate-frequency amplifier 51 selects at least one sideband component of the second intermediate-frequency signal for application to the frequency-modulation detector 52 which detects the modulation components thereof in a usual manner. The frequency-modulation detector 52 then applies the detected components to the audio-frequency amplifier 44' and the loudspeaker 45' for amplification and reproduction as sound, respectively.

The quench signal developed in the superregenerative circuit 60 is applied to the phase-shifting low-pass filter network 53 which passes primarily only the fundamental-frequency component thereof with suitable phase shift to the amplifier and limiter 54. The amplifier and limiter 54 converts the quench-signal component applied thereto to a signal of, for example, rectangular wave shape at the fundamental-quench frequency for controlling the operation of the reactance-tube circuit 55. Accordingly, once during each quench cycle the reactance tube 55 shifts the operating frequency of the oscillator 15' to a second frequency to control the second intermediate-frequency signal in a manner presently to be explained.

The frequency-time operating characteristics of various circuits of the Fig. 3 receiver are represented by the curves of Fig. 4. Curves G, H, I and J represent the operating frequency of the input selector 12', the operating frequency of the oscillator 15', the first intermediate frequency or free oscillation frequency of the superregenerative circuit 60, and the second intermediate frequency corresponding to the center frequency of the selective amplifier 51, respectively. The time axis of the Fig. 4 graph is divided into intervals corresponding to the similarly designated intervals of the Fig. 2 graph, that is, the interval $t_2$—$t_3$ is the oscillation build-up interval and the interval $t_3$—$t_4$ is the saturation-level interval of the superregenerative circuit.

The low-level conversion of the received signal to the first intermediate-frequency signal occurs during the oscillation build-up intervals, such as the interval $t_2$—$t_3$, as explained in connection with the operation of the Fig. 1 embodiment. During the oscillation build-up interval $t_2$—$t_3$, the received signal at the frequency $f_1$ of the input selector 12' and the heterodyne signal at the frequency $f_2$ of the oscillator 15' beat together to develop a first intermediate-frequency signal at the free oscillation frequency $f_1$—$f_2$ of the superregenerative circuit 60.

The high-level conversion of the first intermediate-frequency signal to a second intermediate-frequency signal occurs during saturation-level intervals, such as the interval $t_3$—$t_4$. During the interval $t_3$—$t_4$, the oscillator 15' has a frequency $f_3$, as represented by curve H, higher than the free oscillation frequency $f_1$—$f_2$ by an amount substantially less than the free oscillation frequency. Accordingly, the second intermediate-frequency signal derived from the oscillator output signal and the first intermediate-frequency signal during the interval $t_3$—$t_4$ has a frequency $f_3$—($f_1$—$f_2$) corresponding to the frequency of the selective amplifier 51 represented by curve J.

Because of the selectivity of the amplifier 51, the second intermediate-frequency signal derived during the saturation-level intervals is effectively integrated therein to develop second intermediate-frequency signal components during the oscillation build-up intervals. Accordingly, stray coupling between the unit 51 and the superregenerative circuit 60 may cause the second intermediate-frequency signal at frequency $f_3$—($f_1$—$f_2$) to beat with the output signal of the oscillator 15' at frequency $f_2$ in the superregenerative circuit during the oscillation build-up intervals, providing resultant sum-frequency and difference-frequency signals. The sum and difference frequencies of the beating signals are indicated on the Fig. 4 graph as frequencies $f_s$ and $f_d$, respectively. Accordingly, the resultant sum-frequency and difference-frequency signals are widely separated in the frequency spectrum from the free oscillation frequency $f_2$ of the superregenerative circuit. Thus, no signal feed-back at the free oscillation frequency $f_2$ occurs in the superregenerative circuit during the oscillation build-up intervals, thereby eliminating hang-over oscillations which might otherwise occur.

Operation in this manner also has the advantage that during the saturation-level intervals, such as the interval $t_3$—$t_4$, undesirable back radiation common in saturation-level mode superregenerative receivers is substantially eliminated. This is because during the saturation-level intervals the first intermediate-frequency signal at frequency $f_1$—$f_2$ beating with the output signal of the oscillator 15' at frequency $f_3$ provides a sum-frequency signal substantially different from the frequency $f_1$ of the input selector 12'. The sum frequency is indicated on the frequency axis as $f_{s1}$. Thus, by shifting the operating frequency of the oscillator 15' during the saturation-level intervals, the undesirable effects of hang-over oscillations and back radiation are substantially eliminated.

From the foregoing description, it will be apparent that a receiver embodying the invention also has the additional important advantage that only a single tube is used to provide a first frequency conversion by which the received wave signal is converted to a first intermediate-frequency signal, superregenerative amplification of that first intermediate-frequency signal, and a second frequency conversion by which the amplified first intermediate-frequency signal is converted to an effectively amplified second intermediate-frequency signal, thereby effectively providing superregenerative amplification of the received signal.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A superregenerative superheterodyne wave-signal receiver comprising: a received wave-signal input selector for supplying a received modulated wave signal in a predetermined frequency range; a circuit for supplying a heterodyne wave signal having a frequency differing substantially from that of said received signal by an amount less than the frequency of said received signal; a regenerative oscillatory circuit, including a single regenerator tube having a nonlinear signal-translating characteristic, having a free oscillation frequency substantially equal to the frequency difference between said received and said heterodyne signals, said regenerative circuit being coupled to said input selector and said supply circuit and responsive to both of said signals during the intervals of maximum sensitivity of said regenerative circuit for deriving therefrom a first intermediate-frequency signal having substantially said free oscillation frequency and modulated in accordance with the modulation of said received signal; a self-quench circuit coupled to said regenerative circuit and responsive to said first intermediate-frequency signal for effecting alternate oscillation build-up and oscillation decay intervals in said regenerative circuit to provide a saturation-level mode of operation therefor and to cause superregenerative amplification of said first signal; said regenerative circuit also being responsive to said amplified first signal and to said heterodyne signal at least during the saturation-level intervals of said regenerative circuit and portions of said oscillation build-up intervals for deriving therefrom a second intermediate-frequency wave signal of large amplitude relative to said received signal and having a frequency substantially lower than any of the above-mentioned wave signals and modulated in accordance with the modulation of said received signal; and a first resonant circuit coupled to said regenerative circuit and tuned substantially to the frequency of said second signal for selecting said second signal; and a second resonant circuit coupled to said first resonant circuit and having greater selectivity than said first resonant circuit for selecting one component of said second signal to provide an improved over-all selectivity characteristic for the receiver.

2. A superregenerative superheterodyne wave-signal receiver comprising: a circuit for supplying a received wave signal; circuit means for supplying one or more heterodyne wave signals having a frequency differing substantially from that of said received signal; a regenerative oscillatory circuit having a free oscillation frequency substantially equal to the frequency difference between said received signal and one of said heterodyne signals and coupled to said supply circuits for deriving from said received signal and said one of said heterodyne signals a first wave signal having substantially said free oscillation frequency; a quench circuit couple to said regenerative circuit for effecting alternate oscillation build-up and oscillation decay intervals therein to cause superregenerative amplification of said first signal; said regenerative circuit also being responsive to said amplified first signal and to one of said heterodyne signals for deriving therefrom a second wave signal having a frequency differing substantially from that of any of the above-mentioned wave signals; and a frequency-responsive circuit coupled to said regenerative circuit and primarily responsive to said second signal for selecting at least one component thereof.

3. A superregenerative superheterodyne wave-signal receiver comprising: a received wave-signal input selector for supplying a received wave signal in a predetermined frequency range; a circuit for supplying a heterodyne wave signal having a frequency differing substantially from that of said received signal; a regenerative oscillatory circuit having a free oscillation frequency substantially different from any frequency in said range and substantially equal to the frequency difference between said received and said heterodyne signals, said regenerative circuit being coupled to said input selector and said supply circuit for deriving from said received and heterodyne signals a first wave signal having substantially said free oscillation frequency; a quench circuit coupled to said regenerative circuit for effecting alternate oscillation build-up and oscillation decay intervals therein to cause superregenerative amplification of said first signal; said regenerative circuit also being responsive to said amplified first signal and to said heterodyne signal for deriving therefrom a second wave signal having a frequency differing substantially from that of any of the above-mentioned wave signals; and a frequency-responsive circuit coupled to said regenerative circuit and primarily responsive to said second signal for selecting at least one component thereof.

4. A superregenerative superheterodyne wave-signal receiver comprising: a circuit for supplying a received wave signal; a circuit for supplying a single heterodyne wave signal having a frequency differing substantially from that of said received signal by an amount less than the frequency of said received signal; a regenerative oscillatory circuit having a free oscillation frequency substantially equal to the frequency difference between said received and said heterodyne signals and coupled to said supply circuits for deriving from said received and heterodyne signals a first wave signal having substantially said free oscillation frequency; a quench circuit coupled to said regenerative circuit for effecting alternate oscillation build-up and oscillation decay intervals therein to cause superregenerative amplification of said first signal; said regenerative circuit also being responsive to said amplified first signal and to said heterodyne signal for deriving therefrom a second wave signal having a frequency differing substantially from that of any of the above-mentioned wave signals; and a frequency-responsive circuit coupled to said regenerative circuit and primarily responsive to said second signal for selecting at least one component thereof.

5. A superregenerative superheterodyne wave-signal receiver comprising: a circuit for supplying a received wave signal; a circuit for supplying a heterodyne wave signal having a frequency differing substantially from that of said received signal; a regenerative oscillatory circuit having a free oscillation frequency substantially equal to the frequency difference between said received and said heterodyne signals and coupled to said supply circuits and responsive to both of said signals at least during the intervals of maximum sensitivity of said regenerative circuit for deriving therefrom a first wave signal having substantially said free oscillation frequency; a quench circuit couple to said regenerative circuit for effecting alternate oscillation build-up and oscillation decay intervals in said regenerative circuit to provide a saturation-level mode of operation therefor and to cause superregenerative amplification of said first signal; said regenerative circuit also being responsive to said amplified first signal and to said heterodyne signal at least during the saturation-level intervals of said regenerative circuit for deriving therefrom a second wave signal having a frequency differing substantially from that of any of the above-mentioned wave signals; and a frequency-responsive circuit coupled to said regenerative circuit and primarily responsive to said second signal for selecting at least one component thereof.

6. A superregenerative superheterodyne wave-signal receiver comprising: a circuit for supplying a received wave signal; a circuit for supplying a heterodyne wave signal having a frequency differing substantially from that of said received signal; a regenerative oscillatory circuit having a nonlinear signal-translating characteristic and having a free oscillation frequency substantially equal to the frequency difference between said received and said heterodyne signals, said regenerative circuit being coupled to said supply circuits for deriving from said received and heterodyne signals a first wave signal having substantially said free oscillation frequency; a quench circuit coupled to said regenerative circuit for effecting alternate oscillation build-up and oscillation decay intervals therein to cause superregenerative amplification of said first signal; said regenerative circuit also being responsive to said amplified first signal and to said heterodyne signal for deriving therefrom a second wave signal having a frequency differing substantially from that of any of the above-mentioned wave signals; and a frequency-responsive circuit coupled to said regenerative circuit and primarily responsive to said second signal for selecting at least one component thereof.

7. A superregenerative superheterodyne wave-signal receiver comprising: a circuit for supplying a received wave signal; a circuit for supplying a heterodyne wave signal having a frequency differing substantially from that of said received signal; a regenerative oscillatory circuit, including a single regenerator tube having a nonlinear signal-translating characteristic, having a free oscillation frequency substantially equal to the frequency difference between said received and said heterodyne signals, said regenerative circuit being coupled to said supply circuits for deriving from said received and heterodyne signals a first wave signal having substantially said free oscillation frequency; a quench circuit couple to said regenerative circuit for effecting alternate oscillation build-up and oscillation decay intervals therein to cause superregenerative amplification of said first signal; said regenerative circuit also being responsive to said amplified first signal and to said heterodyne signal for deriving therefrom a second wave signal having a frequency differing substantially from that of any of the above-mentioned wave signals; and a frequency-responsive circuit coupled to said regenerative circuit and primarily responsive to said second signal for selecting at least one component thereof.

8. A superregenerative superheterodyne wave-signal receiver comprising: a circuit for supplying a received wave signal; a circuit for supplying a heterodyne wave signal having a frequency differing substantially from that of said received signal; a regenerative oscillatory circuit having a free oscillation frequency substantially equal to the frequency difference between said received and said heterodyne signals and coupled to said supply circuits for deriving from said received and heterodyne signals a first wave signal having substantially said free oscillation frequency; a self-quench circuit coupled to said regenerative circuit and responsive to said first signal for effecting alternate oscillation build-up and oscillation decay intervals in said regenerative circuit to provide a saturation-level mode of operation therefor and to cause superregenerative amplification of said first signal; said regenerative circuit also being responsive to said amplified first signal and to said heterodyne signal for deriving therefrom during the saturation-level intervals of said regenerative circuit a second wave signal of large amplitude relative to said received signal and having a frequency differing substantially from that of any of the abovementioned wave signals; and a frequency-responsive circuit coupled to said regenerative circuit and primarily responsive to said second signal for selecting at least one component thereof.

9. A superregenerative superheterodyne wave-signal receiver comprising: a circuit for supplying a received modulated wave signal; a circuit for supplying a heterodyne wave signal having a frequency differing substantially from that of said received signal; a regenerative oscillatory circuit, including a regenerator tube having an anode and a cathode, having a free oscillation frequency substantially equal to the frequency difference between said received and said heterodyne signals and coupled to said supply circuits for deriving from said received and heterodyne signals a first wave signal having substantially said free oscillation frequency; a quench circuit coupled to said regenerative circuit for effecting alternate oscillation build-up and oscillation decay intervals therein to cause superregenerative amplification of said first signal; said regenerative circuit also being responsive to said amplified first signal and to said heterodyne signal for deriving therefrom in said tube a second wave signal having a frequency differing substantially from that of any of the above-mentioned wave signals; and a frequency-responsive circuit coupled to the anode-cathode circuit of said regenerator tube and primarily responsive to said second signal for selecting at least one component thereof.

10. A superregenerative superheterodyne wave-signal receiver comprising: a circuit for supplying a received wave signal; a circuit for supplying a heterodyne wave signal having a frequency differing substantially from that of said received signal; a regenerative oscillatory circuit having a free oscillation frequency substantially equal to the frequency difference between said received and said heterodyne signals and coupled to said supply circuits for deriving from said received and heterodyne signals a first wave signal having substantially said free oscillation frequency; a quench circuit coupled to said regenerative circuit for effecting alternate oscillation build-up and oscillation decay intervals therein to cause superregenerative amplification of said first signal; said regenerative circuit also being responsive to said amplified first signal and to said heterodyne signal for deriving therefrom a second wave signal having a frequency differing substantially from that of any of the above-mentioned wave signals; and a resonant circuit coupled to said regenerative circuit and tuned substantially to the frequency of at least one component of said second signal for selecting at least said one component thereof.

11. A superregenerative superheterodyne wave-signal receiver comprising: a circuit for supplying a received wave signal; a circuit for supplying a heterodyne wave signal having a frequency differing substantially from that of said received signal; a regenerative oscillatory circuit having a free oscillation frequency substantially equal to the frequency difference between said received and said heterodyne signals and coupled to said supply circuits for deriving from said received and heterodyne signals a first intermediate-frequency wave signal having substantially said free oscillation frequency; a quench circuit coupled to said regenerative circuit for effecting alternate oscillation build-up and oscillation decay intervals therein to cause superregenerative amplification of said first signal; said regenerative circuit also being responsive to said amplified first signal and to said heterodyne signal for deriving therefrom a second intermediate-frequency wave signal having a frequency equal to the frequency difference between said first and heterodyne signals and substantially lower than any of the above-mentioned wave signals; and a first frequency-responsive circuit coupled to said regenerative circuit and primarily responsive to said second signal for selecting said second signal; and a second frequency-responsive circuit coupled to said first frequency-responsive circuit and having greater selectively than said first frequency-responsive circuit for selecting one component of said second signal to provide an improved over-all selectivity characteristic for the receiver.

12. A superregenerative superheterodyne wave-signal receiver comprising: a circuit for supplying a received wave signal; a circuit for supplying a heterodyne wave signal having a first frequency substantially lower than that of said received signal; a regenerative oscillatory circuit having a free oscillation frequency substantially equal to the frequency difference between said received and said heterodyne signals and coupled to said supply circuits for deriving from said received and heterodyne signals a first wave signal having substantially said free oscillation frequency; a quench circuit coupled to said regenerative circuit for effecting alternate oscillation build-up and oscillation decay intervals in said regenerative circuit to provide a saturation-level mode of operation therefor and to cause superregenerative amplification of said first signal; a circuit coupled between said quench circuit and said heterodyne-signal-supply circuit for shifting the frequency of said heterodyne signal to a second frequency differing from said free oscillation frequency by an amount substantially less than said free oscillation frequency; said regenerative circuit also being responsive to said amplified first signal and to said heterodyne signal at said second frequency for deriving therefrom during said saturation-level intervals a second wave signal having a frequency substantially lower than that of any of the above-mentioned wave signals; and a frequency-responsive circuit coupled to said regenerative circuit and primarily responsive to said second signal for selecting at least one component thereof.

13. A superregenerative superheterodyne wave-signal receiver comprising: a circuit for supplying a received wave signal; a circuit for supplying a heterodyne wave signal having a first frequency substantially lower than that of said received signal; a regenerative oscillatory circuit having a free oscillation frequency substantially equal to the frequency difference between said received and said heterodyne signals and coupled to said supply circuits for deriving from said received and heterodyne signals a first wave signal having substantially said free oscillation frequency; a quench circuit coupled to said regenerative circuit for effecting alternate oscillation build-up and oscillation decay intervals in said regenerative circuit to provide a saturation-level mode of operation therefor and to cause superregenerative amplification of said first signal; a circuit coupled between said quench circuit and said heterodyne-signal-supply circuit and comprising a reactance tube for shifting the frequency of said heterodyne signal to a second frequency substantially lower than said first frequency and higher than said free oscillation frequency by an amount substantially less than said free oscillation frequency; said regenerative circuit also being responsive to said amplified first signal and to said heterodyne signal at said second frequency for deriving therefrom during said saturation-level intervals a second wave signal having a frequency substantially lower than that of any of the above-mentioned wave signals; and a frequency-responsive circuit coupled to said regenerative circuit and primarily responsive to said second signal for selecting at least one component thereof.

References Cited in the file of this patent

UNITED STATES PATENTS

| | | |
|---|---|---|
| 1,657,451 | Affel | Jan. 31, 1928 |
| 1,657,462 | Espenschied | Jan. 31, 1928 |
| 1,730,605 | Farrington et al. | Oct. 8, 1929 |
| 2,100,605 | Linsell | Nov. 30, 1937 |
| 2,160,663 | Jensen | May 30, 1939 |
| 2,383,345 | Seiler | Aug. 21, 1945 |
| 2,588,022 | Loughlin | Mar. 4, 1952 |
| 2,613,315 | Richman | Oct. 7, 1952 |

FOREIGN PATENTS

| | | |
|---|---|---|
| 225,907 | Great Britain | Dec. 11, 1924 |